(12) United States Patent
Loya

(10) Patent No.: US 8,950,635 B2
(45) Date of Patent: Feb. 10, 2015

(54) UNITARY PRODUCT-DISPENSING CONTAINER HAVING A COMBINED CAP AND FEEDING/ DOSING DISPENSER

(71) Applicant: Heather Baird Loya, High Bridge, NJ (US)

(72) Inventor: Heather Baird Loya, High Bridge, NJ (US)

(73) Assignee: Honey Bee Babies, LLC, Oldwick, NJ (US)

( * ) Notice: Subject to any disclaimer, the term of this patent is extended or adjusted under 35 U.S.C. 154(b) by 0 days.

(21) Appl. No.: 13/785,670

(22) Filed: Mar. 5, 2013

(65) Prior Publication Data

US 2014/0138408 A1 May 22, 2014

Related U.S. Application Data

(60) Provisional application No. 61/610,584, filed on Mar. 14, 2012.

(51) Int. Cl.
*B65D 35/44* (2006.01)
*B65D 1/32* (2006.01)
*B65D 41/26* (2006.01)
*B65D 47/08* (2006.01)

(52) U.S. Cl.
CPC *B65D 1/32* (2013.01); *B65D 41/26* (2013.01); *B65D 47/0804* (2013.01)
USPC .......................................... 222/212; 222/206

(58) Field of Classification Search
CPC .................................................... B65D 51/246
USPC .......... 222/206, 212, 369, 393; 206/218, 217, 206/223, 541, 546, 577; 215/228; 220/212
See application file for complete search history.

(56) References Cited

U.S. PATENT DOCUMENTS

| | | | |
|---|---|---|---|
| 1,784,880 A | 12/1930 | Phillipson | |
| 3,116,152 A | 12/1963 | Smith | |
| 3,208,625 A * | 9/1965 | Bernini | 220/269 |
| 3,312,366 A * | 4/1967 | Poris | 220/521 |
| 3,383,018 A | 5/1968 | Grimsley | |
| 3,428,099 A | 2/1969 | Tenenouser | |
| 3,730,372 A * | 5/1973 | Komendowski | 215/47 |
| 3,804,282 A | 4/1974 | Komendowski | |
| 3,955,742 A * | 5/1976 | Marshall et al. | 220/574 |
| 4,373,640 A * | 2/1983 | Resio | 215/228 |
| 4,724,615 A | 2/1988 | Mackles et al. | |
| 4,830,222 A | 5/1989 | Read | |
| 5,038,974 A | 8/1991 | Da Costa | |
| 5,106,221 A | 4/1992 | Diot et al. | |
| 5,695,084 A | 12/1997 | Chmela et al. | |
| 6,295,735 B1 | 10/2001 | Barger | |
| 6,399,079 B1 | 6/2002 | Mehta | |
| 6,585,136 B1 * | 7/2003 | Stern | 222/336 |

(Continued)

*Primary Examiner* — Donnell Long
(74) *Attorney, Agent, or Firm* — David R. Conklin; Kirton McConkie

(57) ABSTRACT

The present application relates to a self-contained, hand-held dispenser for providing a user-determined amount of a substance. The hand-held dispenser includes a hand-squeezable reservoir that is structured to enable the dispenser to be readily stackable with other such dispensers. The hand-help dispenser further includes a dispensing portion that protectively seals a substance stored in the reservoir and is further configured to control dispensation of the substance for a user-predetermined purpose, such as for consumption of the substance. Further still, the dispenser includes a cover having a first and a second position for providing access to the reservoir and/or dosing a substance contained therein.

18 Claims, 3 Drawing Sheets

(56) References Cited

U.S. PATENT DOCUMENTS

| | | | |
|---|---|---|---|
| 6,604,645 B1* | 8/2003 | Vaupotic | 220/212 |
| 6,688,469 B1* | 2/2004 | Barnes | 206/541 |
| 6,761,283 B1* | 7/2004 | Gilliam et al. | 220/837 |
| 7,213,620 B2* | 5/2007 | DeJonge | 141/22 |
| 7,882,989 B2* | 2/2011 | Briles | 222/356 |
| 7,997,412 B2* | 8/2011 | Henry et al. | 206/542 |
| 2003/0029868 A1* | 2/2003 | Davidov et al. | 220/212 |
| 2004/0094548 A1* | 5/2004 | Laveault | 220/212 |
| 2007/0164045 A1 | 7/2007 | Wydler et al. | |
| 2008/0112750 A1 | 5/2008 | Thomson | |
| 2010/0147885 A1 | 6/2010 | Braxton et al. | |
| 2012/0114800 A1* | 5/2012 | Mckay | 426/72 |

* cited by examiner

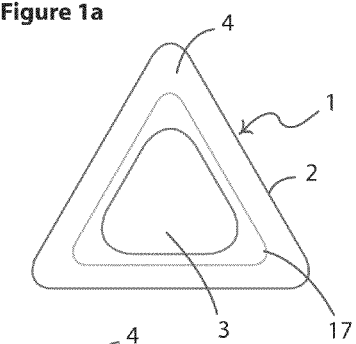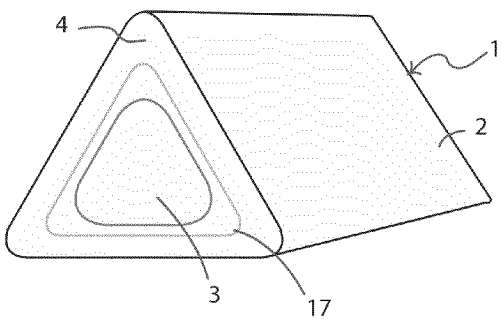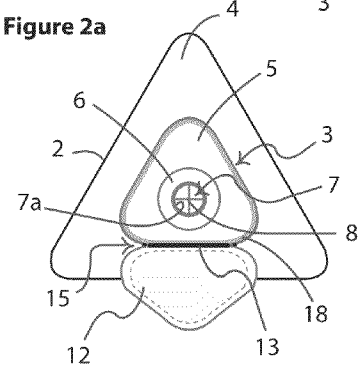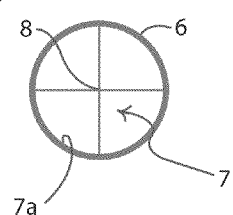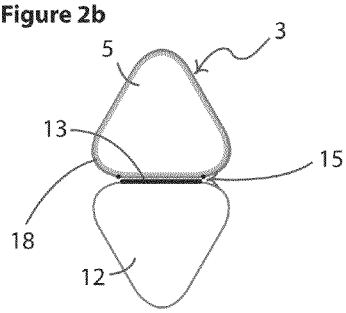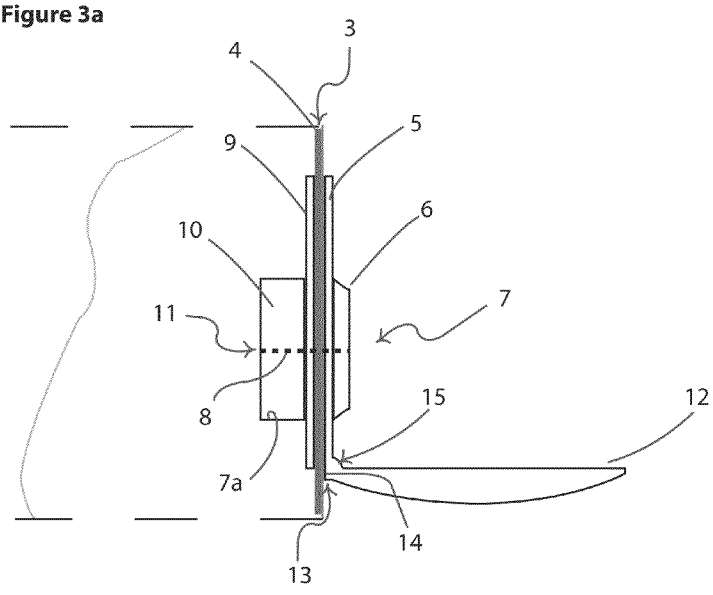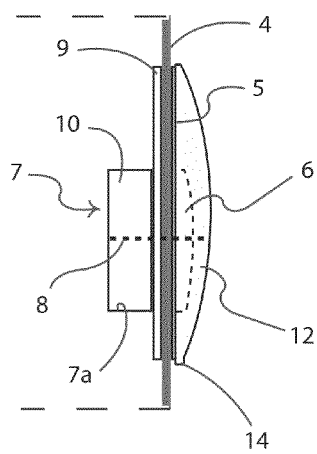

UNITARY PRODUCT-DISPENSING CONTAINER HAVING A COMBINED CAP AND FEEDING/ DOSING DISPENSER

Applicant hereby claims the benefit of the filing of Provisional Application No. 61/610,584 filed Mar. 14, 2012

FIELD OF THE INVENTION

The present invention relates to a safe and effective self-contained substance (liquid or amorphous) dispensing package particularly useful as for baby food, medicines and/or in connection with sports, such as mountain climbing, and more particularly to a unitarily constructed container having its own measuring/dosing instrument dually serving as a feeding/dispensing implement and cap or cover for the container.

BACKGROUND OF THE INVENTION AND PRIOR ART KNOWN TO APPLICANT

In the prior art, it has been difficult for the consumer to find an easy, safe and convenient-to-use package to transport and dispense food, medicine or other needed substances. For instance, a glass jar, historically the most typical baby food package, is breakable. Additionally, once the safety seal is broken, transporting leftovers can potentially lead to leaks. Plastic containers are easier to transport, however they are typically bulky. Plastic containers and their lids, caps or covers, are not as secure when refastened, again potentially leading to leaks.

More recently, a pouch structure was introduced to the market. This package was more convenient than glass and existing plastic containers, as it is made of foil. This container design has a plastic screw top which is deemed more efficient or effective for say carrying leftovers.

Particularly during travel, a consumer may find his or herself with no feeding implement, such as a spoon, leaving no way to easily feed their baby. In the case of the above-mentioned pouch, the arrangement typically is provided with a straw for dispensing, so in these situations one could squeeze the food into the baby's mouth via the straw by squeezing the pouch. However, under these circumstances, it is difficult to measure the amount dispensed. And, with no utensil, this process is usually messy for both baby and user. The pouch's foil package also typically has sharp protruding edges, making it uncomfortable to squeeze, and potentially hazardous for other apparent reasons. Lastly, it also has a separate cap that poses a potential choking hazard to the baby.

Further examples of arrangements with separate/detachable pieces may be seen in the following references. Mehta et al, U.S. Pat. No. 6,399,079, teaches a separate cap screwed onto a package/container, with a separate spoon that is intended to screw onto the package once a cap is removed. This requires the consumer to carry both pieces and undertake to perform the above attachment prior to intended use. The spoon does not serve as a cap or vice versa. Moreover, the pieces are deemed not to be sized to be choke resistant, and thus when one is not in use, there is posed a choking hazard. Chmela et al, U.S. Pat. No. 5,695,084, teaches a largely unitary container prior to use. However the feeding implement/spoon is detached once the container is opened for its intended use. The spoon is also not used as a cap or to reseal or refasten to the container, but is simply stored within the lid until its intended use, at which time it is separated and removed. The same is deemed true of Vaupotic, U.S. Pat. No. 6,604,645 B1.

Braxton et al Patent Application Publication U.S. 2010/0147885 A1, on the other hand appears to suggest a package where a fitment or feeding instrument is indicated to be substantially permanently affixed to the package. However, as described, this arrangement is manufactured with multiple separate pieces, and does not appear to be practical for unitary construction. Furthermore, Braxton appears to teach construction with a separate detachable cap, posing a potential choking hazard. Moreover, the feeding Instrument portion does not appear to dually serve as a secure cap or cover.

The prior art has also presented issues with respect to storing packages/containers safely and in an orderly manner. Because they are breakable, it is a hazard to stack glass jars, as they may fall. This leads to waste in valuable shelf space in supermarkets. Pouches such as that described hereinabove are difficult to store, as they are not easily stackable, which leads to disorganized pantry and supermarket shelves. These conditions make difficult the selection of the package based on a particular desired content.

In general, plastic containers exist which were designed to facilitate stacking neatly and with regard to organized storage, but they customarily do not combine such advantages with the attributes of a fully self-contained, unitarily constructed, readily transportable and safe arrangement that provides its own non-detachable implement for roughly measured dispensing/feeding, whereby the feeding implement serves dually as the cap or cover of the container, particularly under potentially repeated usage.

Other related arrangements and concepts known to the art may be found in Diot et al U.S. Pat. No. 5,106,221; DaCosta U.S. Pat. No. 5,038,974; Read U.S. Pat. No. 4,830,222; Smith U.S. Pat. No. 3,116,152; Thomson U.S. Pat. Appl. Publ. US 2008/0112750 A1; Wydler et al U.S. Pat. Appl. Publ. U.S. 2007/0164045 A1; Barger U.S. Pat. No. 6,295,735 B1; Mackles et al U.S. Pat. No. 4,724,615; Komendowski U.S. Pat. No. 3,804,282; Tenenouser U.S. Pat. No. 3,428,099; Grimsley U.S. Pat. No. 3,383,018; and Phillipson U.S. Pat. No. 1,784,880, but these teachings, individually or cumulatively, are not deemed to bring the reader closer to the present invention than the prior art particularized above.

SUMMARY OF THE INVENTION

The instant invention is deemed to overcome the drawbacks resident in prior art arrangements. In accordance with the invention, therefore, there is provided a unitarily constructed, readily stackable and transportable package having a supply of product, such as food, which is dispensable in roughly measurable or doseable amounts through an orifice constituting part of the package's dispensing arrangement that serves as both dispensing/feeding implement and secure cap.

The package according to the invention is comprised of a container portion, preferably made of flexible (squeezable) material that houses the substance to be dispensed, and a self-contained dispensing portion constructed with the container portion to provide a true permanently unitary structure. The dispensing portion in turn provides a dispenser arrangement preferably comprising a dispensing/feeding instrument (e.g., a spoon), wherein the dispenser provides a capping arrangement regarding the package's contents in a first position, and in a second position receives roughly measured or dosed amounts of the package's dispensable contents, which is then directly and conveniently accessible by/to the user.

In preferred form, the feeding instrument is permanently/unitarily attached to/part of the package such that it constitutes a cap of and to the container portion of the package when in the closed position. When opened, the feeding instrument allows loosely measured or dosed amounts of the package's contents to be received by itself for direct availability to the user. If the entire contents has not been dispensed, the user may cause the feeding instrument portion to securely reassume the closed or capping position. The preferred flexible packaging is utilized by simply squeezing the container and thereby its contents into the feeding instrument portion for easy and convenient reception of the contents by or for the user.

The package may also provide, by design, or be provided with, a tamper resistant seal. In the latter sense, this could be affixed around the periphery of the package edges and serve as sanitary protection to the feeding instrument. Such a package could most preferably be used for dispensing foods, particularly baby foods. However, the invention is not to be deemed limited to one type or kind of food and can be used in other applications and dispensable substances.

The present invention is seen to take into account and solve the various issues resident in the prior art, in particular the drawbacks described herein. The arrangement according to the invention constitutes a unitary structure providing three main aspects: the package itself, particularly shaped and being constructed from a flexible material, and a dispensing portion that provides the arrangement with its own dispensing/feeding implement (e.g., spoon), and which also serves as a cap or cover. The feeding implement/spoon acts as a secure cap when in the closed position. When opened, the implement "flips down" to assume full operative position.

The flexible package is utilized by squeezing the contents into/onto the spoon for easy and convenient consumption or use of the packaged dispensable product. The dispensing implement simply is flipped back into the secure closed position, making it easy to transport residual contents (e.g., leftovers). It is intended that the package according to the invention be 100% recyclable, so can be easily disposed-of in one piece. The invention is intended to remain unitary throughout its useful life; i.e., once the consumer possesses it and unwraps it from packaging, through and during use (feeding), and lastly to the point of securing leftover product and/or discarding the article as a fully recyclable item.

The present invention's feeding instrument is constructed/formed in one solid piece, and would preferably be sized larger then 32 mm, thereby effectively eliminating the possibilities of a choking hazard. Unitary manufacture also cuts down on manufacturing costs. The preferred geometric shapes allow for easy and safe stacking and for neat and efficient shelving, such as in the pantry or grocery store.

BRIEF DESCRIPTION OF THE DRAWINGS

FIGS. 1a and 1b are diagrammatic end and perspective views respectively of a self-contained food container-dispenser, having elongated shape of substantially triangular cross-section.

FIG. 2a shows in partially schematic view, the dispensing portion of the product-dispensing arrangement with respect to the container portion, in accordance with the invention.

FIGS. 2b and 2c illustrate respective parts of the dispensing portion in accordance with the invention.

FIGS. 3a and 3b are diagrammatic side illustrations of the dispensing portion in respectively the open/operative and closed modes/positions.

DETAILED DESCRIPTION OF THE INVENTION

Figure 4A:
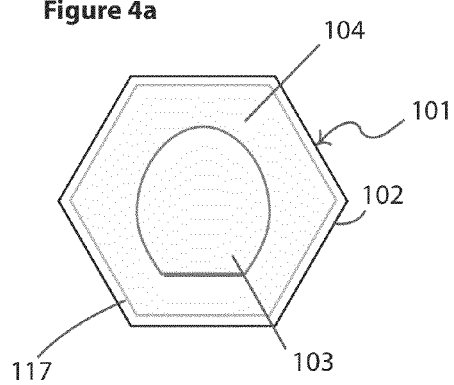
FIGS. 4a and 4b are diagrammatic end and perspective views respectively of a self-contained food container-dispenser according to the invention, having elongated shape of substantially hexagonal cross-section.

FIGS. 1a and 1b show in anterior and perspective views respectively an elongated package 1 of substantially triangular cross-section, comprising a flexible/squeezable, single-seamed (substantially continuous) or seamless (continuous) container portion 2 of foil, light biodegradable plastic, or the like, and a dispensing portion 3 associated with one end 4 of the container portion 2, of plastic, acrylic or other suitable composition. In the form in which the package is initially made available to the user or consumer, the dispensable contents of the container portion are protectively sealed by the dispensing portion itself. Moreover, the dispensing portion, and indeed the entire package, may be further sealed with or in a thin layer of removable material 17, such as a biodegradable clear plastic or foil, which may have a light surface adhesive in the case of providing an additional covering/sealant for the dispensing portion.

Figure 4B:
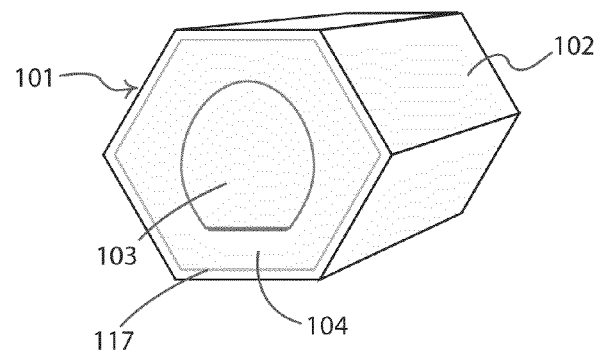
Figure 5A:
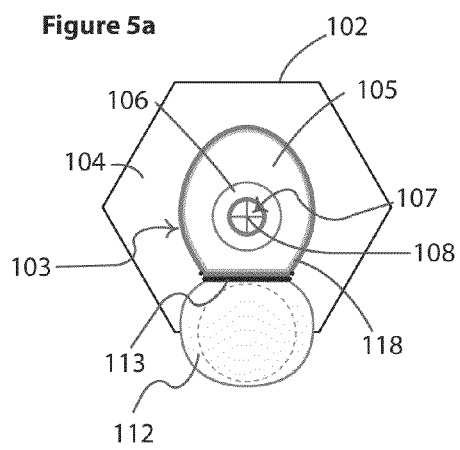
FIGS. 5a and 5b show in largely schematic view the dispensing portion of the product-dispensing arrangement per se and with respect to a hexagonally shaped container portion, in accordance with the invention.
Figure 5B:
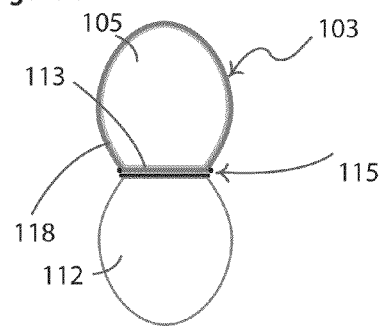

As may be seen in FIG. 2a, and more particularly with respect to FIGS. 3a and 3b, the dispensing portion 3 of the package 1 according to the invention is provided with respect to one end surface 4 of the container portion 2, such that the container and dispensing portions are permanently and preferably unitarily inseparable from one another. In true unitary construction, the dispensing portion 3 includes an outer flange 5 flatly arranged against the outer side of end surface 4. Flange 5 preferably is shaped to be consistent with the shape of end surface 4. However, other shapes may be employed and may readily come to mind, such as round or oval (as seen in FIGS. 4 and 5).

Outer flange 5 is provided with a substantially centrally located slightly raised portion or lip 6 which defines an orifice or spout and the outer portion of a channel 7 through the end surface 4 and dispensing portion 3, by which the contents of the container portion 2 may be suitably discharged from the package. In the formation of the dispensing portion, by known manufacturing techniques, the inner wall 7a of channel 7 is provided along its length with a protective division 8, such as the "cross-hairs" arrangement shown, for preventing discharge of relatively large substantially solid pieces (i.e., potential choking hazards) that may be resident in the package's contents from exiting the container portion 2.

Dispensing portion 3 further includes an inner flange 9 (FIGS. 3a and 3b), preferably of matching shape to outer flange 5. Inner flange 9 is shown to be also provided with a centered raised part 10 that defines an inner orifice 11 and the remainder of the channel 7 through the dispensing portion 3. In the embodiments illustrated in the Figures, channel 7 is shown to be preferably widest at the inner orifice 11 and narrowest at the opposite or outer orifice. However, reasonable alternatives readily come to mind, such as a channel of consistent cross-section throughout. Moreover, although the channel 7 is depicted as circular in cross-section, other shapes, such as oval, may be employed.

Unitarily formed with outer flange 5 is a cap or cover 12. Cover 12 and outer flange 5 are permanently joined via a plastic hinge 13, whereby cap or cover 12 may assume open (FIG. 3a) and closed (FIG. 3b) positions as desired by the user. The structure and formation of hinge 13 are well known in the art. In the closed position (FIG. 3b), cap 12 suitably covers over, and effectively seals, the orifice or spout 6, and in the open position facilitates discharge of the package's contents through squeezing the container portion 2. To close efficiently, cap 12 snaps/clicks into outer flange 5. Flange 5 may be provided with a recess 18 to facilitate closure. To further the sealing capability of cap 12, the latter could be provided on its inner broad surface, i.e., the surface facing the spout 6 [[and outer flange 5, would mimic curve and shape of cap 12 (not particularly shown within which the spout 6 would seat as also seen in diagrammatic and perspective views of FIG. 6. Another variation of the spoon and cap 12 is shown in FIG. 6b wherein the convex flange 5 and concave cap 12 are curved to organically mimic each ones shape aiding in effectively sealing spout 6 when cap 12 is in closed and snapped position.]] with a suitably shaped and located shallow recess (not particularly shown) within which the spout 6 could seat. This concept is more particularly addressed in connection with the embodiment depicted in FIGS. 6a-c. Other suitable means and arrangements may also come to mind to facilitate this loose sealing function.

As illustrated, cover 12 is spoon shaped, with the concave surface facing spout 6, to provide the dual function of a feeding implement. Cover 12 additionally allows the user a means to measure, on a rough scale, the amount of individual discharges of the package's contents from the container portion, and thus may, for example, take the shape of a small cup, with graduations provided.

In its formation of substantially rigid material, cap or cover 12 is provided with a detent or stop 14, proximate the hinge 13 that restricts the swing of the cover 12 to a maximum open position that is substantially perpendicular to flange 5. Thus, the cover 12 is free to assume any orientation between the closed position and this maximum open position. While the depicted embodiments show the hinge 13 (and thus the principal plane of the cover 12) to be preferably aligned with one of the sides of the end portion 4 of the container 2, the dispensing portion 3, relative to the container portion 2 may take any suitable position, orientation or alignment as to the hinge 13 and thus the cover 12.

Also provided in connection with the formation of the dispensing portion is a pair of rounded or largely spherical nodes or protuberances 15 proximate either end of the hinge 13. Nodes or extensions 15 are positioned and arranged to cooperate in a known manner with the cover 12, such that the latter effectively snaps securely into place when assuming the closed position.

In operation, the user would unwrap the package 1 by removing the protective seal from the closed cover 12. With the cover 12 swung into (allowed to assume) the primary open position, the package is now ready for the user to dispense the contents by gentle squeezing of the container portion, whereby the contents proceed through channel 7 and orifice or spout 6 and into the feeding implement or cover 12, for consumption or other intended use of the contents.

FIGS. 4 and 5 depict a second embodiment of the container-dispenser 101 according to the invention. In this instance, the shape of the container portion 102 is substantially hexagonal, with the dispensing portion 103 associated with the one end 104 of the package. Dispensing portion 103 is substantially ovid in shape (in closed position) and when assuming the open position, preferably forms a pair of unitarily-constructed, mirror-imaged, largely oval-shaped parts comprising flange 105 and cover/lid 112, which share hinge 113. Cover/lid 112 may also be provided with sealing recess (not particularly shown), similar to the aforementioned cover recess, and flange 105 may be provided with a recess 118, similar to recess 18 of the embodiment(s) depicted in FIGS. 1-3.

It will be appreciated that other readily stackable and transportable, conveniently operable shapes of the container portion of the package may readily come to mind, such as an elongated structure with square or rectangular cross-section, or a 5-sided arrangement.

Dispensing portion 103 has, in similar manner to the embodiment of FIGS. 1 and 2, a spout 106, defining the end of a channel 107 which can be provided with flow restrictor 108 to prevent ejection of larger solid pieces from the container portion 102. Though not particularly shown, the inner portion of the dispensing arrangement is formed to provide essentially the same functions as described in connection with the triangular shaped embodiment of FIGS. 1 and 2, and thus includes an inner flange that defines the inner portion of channel 107.

In operation, the embodiment(s) of FIGS. 4 and 5 function in substantially the same manner as described hereinbefore, with cover 112 able to assume open and closed positions, and constituting a cap for spout 106 in the closed position, as secured by rounded nodes 115 of flange 105 and recess 118.

The package can be provided with a tamper-resistant seal 117 (FIGS. 4a-b) affixed around the periphery of the package edges, which serves as sanitary protection to the feeding instrument portion.

As is the case with the embodiment(s) of FIGS. 1-3, the package illustrated in FIGS. 4-5 is made of a malleable/flexible material (foil or plastic) that is both recyclable and BPA (Bisphenol-A) free. It will be readily appreciated that foil and plastic are easy to heat by either running tap water over package or setting it in a cup of relatively hot water till desired temperature is reached. The arrangements according to the invention eliminate the need for a separate dispensing/feeding implement (spoon) or bowl. This innovative design also eliminates the need for cleanup, as the user can simply throw the package into a recycling bin.

The geometric shape of the container makes the package readily stackable. According to the depicted illustrations, the package can also stand upright for additional shelf display and storage options.

Figure 6A:
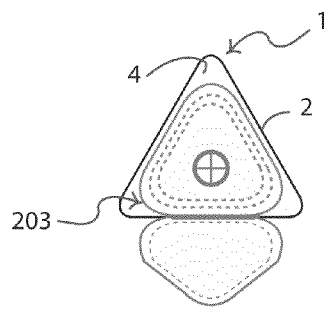
FIGS. 6a-6c illustrate respectively in partially schematic end view and diagrammatic side views the dispensing portion having a convex structure, according to the invention.
Figure 6C:
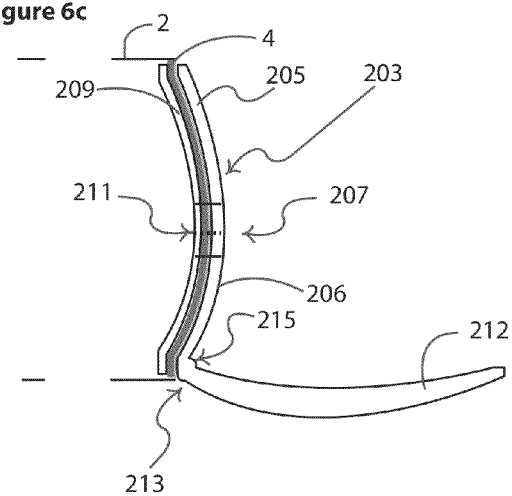
Figure 6B:
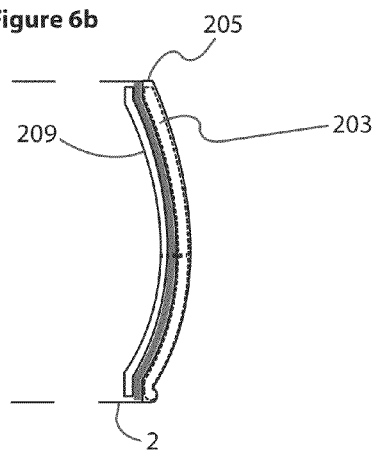

FIGS. 6a-6c illustrate a further embodiment according to the invention, whereby the dispensing portion has a convex shape/structure. In this arrangement, the one end 4 of container portion 2 is provided with dispensing portion 203, which comprises outer and inner flanges 205 and 209 respectively that assume an outwardly curved shape relative to the interior of the container. In similar manner to the embodiments of FIG. 105, the dispensing portion 203 defines a channel 207 that allow the container's contents to pass via inner orifice 211 to the exterior to be collected by and in the spoon-shaped implement 212 unitarily formed as a part of the dispensing portion via plastic hinge 213.

The shape of Spoon 212 coincides with the concave shape of flanges 205 and 209, which enables the feeding implement to securely snap into place in a recess provided in outer flange 205, substantially as described in connection with the embodiments of FIGS. 1-5. Thus the outer flange 205 mimics the curvature and shape of cap/cover 212 within which (though not particularly shown) the spout 206 would seal. Such arrangement aids in effectively sealing spout 206 when cap 212 is in closed and snapped position.

The ergonomic package design and malleable material make it safe and comfortable to hold when feeding with the convenient attached spoon. With the container seamless or having only one seam, the multiple sharp edges found in other foil packaging have been eliminated.

There are no small or loose parts, such as a separate lid or cap, thereby making the instant invention baby friendly and choke resistant. The cap/spoon itself can preferably measure 32 mm (or larger) as may be stated or required by infant safety standards. Manufacture is accomplished as one piece, with a 'living' hinge, such that the package's elements cannot be separated or detached or the package, accidently, by hand or otherwise. This simultaneously eliminates potential safety hazards and high manufacturing costs.

While the feeding/dispensing implement preferably (for aesthetics) mimics the shape of its container, whether triangular, square, rectangular, circular, trapezoidal, ovid, etc., it does not have to do so. The spoon can for example be classically shaped and not necessarily consistent with the container's shape.

In terms of the package of the instant invention being applied in a food-dispensing mode, the contents of the container portion should preferably be of a pureed thick consistency, to allow appropriate flow from the container portion to the feeding implement, but yet thick enough to remain easily on the spoon during use.

The package herein presented according to the invention is one which is self contained, ecologically sound as well as safe. While the invention is particularly useful with respect to the baby food industry, it is readily adaptable for use in several different markets, targeting a wide variety of consumers and needs. Due to its ease of use, it can be employed for dispensing adult foods, medicines and vitamins, in say a geriatric sense. Other markets could be for the consumer or outdoorsman interested in camping, mountain climbing or sports, children's lunch foods, foods for the elderly/infirm, airline foods, and disaster/survival foods. The package is intended to be 100% recyclable and thus would appeal to the conscientious green consumer. The materials used are intended to be lightweight and compactly constructed, reducing the overall carbon footprint needed for shipping and needless costly overhead.

Virtually every product, whether grown or manufactured, must be packaged to reach the consumer in an acceptable condition. On the basis of gross domestic product, packaging is the third largest industry in the United States. Baby food has proven to be the most dynamic category of the global foods packaging industry, with global retail spending on baby food amounting to around $37 billion in the year 2010. The suppliers of the more traditional formats such as those herein discussed are being challenged by the consumer to come up with alternative, safe, readily transportable and easy-to-use packaging format, which particularly seek to address busy parents' lifestyles. Organic packaging as an adjunct of the evolution in consumer importance is fast becoming a vastly growing trend.

The invention claimed is:

1. A self-contained, hand-held dispenser comprising:
a hand-squeezable reservoir comprising a closed end, an end surface having an opening, and a container portion located therebetween, the container portion having a volume for receiving a substance;
a dispenser fixedly positioned within the opening, the dispenser comprising an outer flange in contact with an outer surface of the end surface, and further comprising an inner flange in contact with an inner surface of the end surface and located within the volume of the container portion, the end surface being interposedly positioned between the inner and outer flanges, the dispenser further comprising a channel in fluid communication with the volume and providing a pathway through the dispenser;
a flow restrictor disposed within the pathway and having one or more protective divisions that divide a cross-section area of the pathway into two or more cross-section areas; and
a cover comprising a bowl-shape having an outer perimeter edge, a portion of the outer perimeter edge being hingedly coupled to the outer flange and moveable between a closed position and an open position, wherein the closed position covers the dispenser, and the open position exposes the dispenser by locating the outer perimeter edge in a horizontal plane that is approximately perpendicular to a vertical plane of the outer flange.

2. A hand-held dispenser according to claim 1, wherein the reservoir further comprises an outer surface having a structure to enable the dispenser to compatibly stack with two or more like-structured dispensers.

3. A hand-held dispenser according to claim 1, further comprising a hinge interposed between the cover and the outer flange, wherein the cover, the outer flange, the inner flange, and the flow restrictor comprise a monolithic structure.

4. A hand-held dispenser according to claim 1, further comprising a selectively-removable seal applied to at least one of the cover, the pathway, the dispenser, and the reservoir for pre-use maintenance of non-contamination of the substance.

5. A hand-held dispenser according to claim 1, wherein the reservoir is seamless and devoid of sharp edges and sharp corners.

6. A hand-held dispenser according to claim 1, wherein said bowl-shape of said cover further comprises a known volume for measuring and dosing a desired amount of the substance via the cover.

7. A hand-held dispenser according to claim 6, wherein said dispenser is positioned in proximity to said cover such that the substance within the container portion is readily squeezed from the dispenser and exits the container portion via the dispenser and into the bowl-shape when the cover is in the open position.

8. A hand-held dispenser according to claim 1, wherein the hand-held dispenser is recyclable.

9. A hand-held dispenser according to claim 1, wherein at least one of said end surface and said outer flange comprises at least one of a width dimension and a height dimension being greater than 32 mm.

10. A hand-held dispenser according to claim 1, wherein said substance comprises at least one of an amorphous substance and a fluid substance.

11. A hand-held dispenser according to claim 4, wherein the selectively-removable seal comprises a removable film or an inert bio-friendly material.

12. A hand-held dispenser according to claim 1, wherein said volume of said container portion is selected to receive a known volume of the substance, wherein the known volume of the substance is equal to a desire amount of the substance for dosing via the cover.

13. A hand-held dispenser according to claim 1, wherein the structure of the outer surface of the reservoir comprises a cross-sectional shape selected from the group consisting of square, triangular, rectangular, circular, trapezoidal, and ovid.

14. A hand-held dispenser according to claim 13, wherein the outer perimeter edge defines a shape that is approximately the same as the cross-sectional shape.

15. A hand-help dispenser according to claim 4, wherein following the removal of the selectively-removable seal, the closed position causes the cover to substantially reseal the dispenser.

16. A hand-held dispenser according to claim 1, wherein the cover further comprises at least one of a stop and a detent proximate a hinge of the cover, that restricts a swing of the cover to a maximum open position wherein the perimeter edge is in the horizontal plane.

17. A self-contained, hand-held dispenser comprising:
a hand-squeezable reservoir comprising a closed end, an end surface having an opening, and a container portion located therebetween, the container portion having a volume for receiving a substance, the reservoir further comprising an outer surface having a first cross-sectional shape, and an inner surface having a second cross-sectional shape;
a dispenser fixedly positioned within the opening, the dispenser comprising an outer flange having an outer shape that is the same as the first cross-sectional shape, the outer flange being in contact with an outer surface of the end surface, and further comprising an inner flange having an outer shape that is the same as the second cross-sectional shape, the inner flange being in contact with an inner surface of the end surface, the inner flange being located within the volume of the container portion, the end surface being interposedly positioned between the inner and outer flanges, the dispenser further comprising a channel in fluid communication with the volume and providing a pathway through the dispenser;
a flow restrictor disposed within the pathway and having one or more protective divisions that divide a cross-section area of the pathway into two or more cross-section areas; and
a cover comprising a bowl-shape having an outer perimeter edge, a portion of the outer perimeter edge being hingedly coupled to the outer flange and moveable between a closed position and an open position, wherein the closed position covers the dispenser, and the open position exposes the dispenser by locating the outer perimeter edge in a horizontal plane that is approximately perpendicular to a vertical plane of the outer flange.

18. A self-contained, hand-held dispenser comprising:
a hand-squeezable reservoir comprising a closed end, an end surface having an opening, and a container portion located therebetween, the container portion having a volume for receiving a substance, the reservoir further comprising an outer surface having a first diameter, and an inner surface having a second diameter;
a dispenser fixedly positioned within the opening, the dispenser comprising an outer flange having an outer diameter that is approximately equal to the first diameter, the outer flange being in contact with an outer surface of the end surface, and further comprising an inner flange having an outer diameter that is approximately equal to the second diameter, the inner flange being in contact with an inner surface of the end surface and located within the volume of the container portion, the end surface being interposedly positioned between the inner and outer flanges, the dispenser further comprising a channel in fluid communication with the volume and providing a pathway through the dispenser;
a flow restrictor disposed within the pathway and having one or more protective divisions that divide a cross-section area of the pathway into two or more cross-section areas; and
a cover comprising a bowl-shape having an outer perimeter edge, a portion of the outer perimeter edge being hingedly coupled to the outer flange and moveable between a closed position and an open position, wherein the closed position covers the dispenser, and the open position exposes the dispenser by locating the outer perimeter edge in a horizontal plane that is approximately perpendicular to a vertical plane of the outer flange.

* * * * *